United States Patent Office 3,251,790
Patented May 17, 1966

3,251,790
COATING COMPOSITIONS FROM SYNTHETIC LATICES EMULSIFIED WITH NEUTRALIZED ADDUCTS OF FATTY OILS AND $\alpha,\beta$-UNSATURATED DICARBOXYLIC ACIDS
Roger M. Christenson, Gibsonia, Donald P. Hart, Allison Park, Peter M. Chairge, Springdale, and Fred S. Shahade, New Kensington, Pa., assignors to Pittsburgh Plate Glass Company, Pittsburgh, Pa., a corporation of Pennsylvania
No Drawing. Filed Nov. 29, 1961, Ser. No. 155,820
11 Claims. (Cl. 260—18)

This application is a continuation-in-part of application, Serial No. 815,789, filed May 26, 1959, now abandoned.

This invention relates to water-dispersed coating compositions, and pertains more particularly to coating compositions containing an adduct of unsaturated carboxylic acid anhydride and drying oil fatty acid esters or semi-drying oil fatty acid esters and a synthetic polymeric latex.

It is known that drying oils and semi-drying oils can be reacted with an unsaturated anhydride such as maleic anhydride to form a water insoluble adduct, which adduct can be made water soluble by neutralization with ammonia or water soluble amines. For example, these materials are disclosed generally in U.S. Patents Nos. 2,188,885, 2,188,882, 2,188,883, 2,188,884, 2,188,886, 2,188,887, 2,188,888, 2,188,890 and 2,262,923.

In the past, however, the materials disclosed in the above and other patents have had somewhat limited use in coating compositions. This is due primarily to the fact that many of these materials are not completely water soluble and thus do not form homogeneous solutions. Also, these same materials are deficient in water resistance, humidity resistance and corrosion resistance. This is also true when the adduct contains more than about 45 percent by weight of the unsaturated acid anhydride component.

It has now been discovered that coating compositions with outstanding properties can be obtained by blending synthetic polymeric latices with addducts of drying oil fatty acid esters or semi-drying oil fatty acid esters and unsaturated dicarboxylic acid anhydrides, or an unsaturated dicarboxylic acid which forms an anhydride, or fumaric acid, if such adduct is prepared by utilizing about 4 percent to 45 percent by weight of the dicarboxylic acid anhydride and then neutralizing at least about 50 percent of the acidity of said adduct. The resulting coating compositions have the following advantages:

(1) They are water reducible.
(2) They will not coagulate or throw out of solution as readily as many latex or water-dispersed emulsion systems.
(3) They are nonflammable as opposed to the high flammability of solvent based coatings.
(4) They possess excellent freeze-thaw stability.
(5) High solids content can be obtained at dip and spray viscosities.
(6) They possess good corrosion protection when baked, actually superior to that of alkyd-based solvent-thinned coating compositions.
(7) A high gloss can readily be obtained if desired.
(8) They possess excellent package stability and are remarkably free of settling.
(9) They are low cost.
(10) They will not mud crack (a phenomenon which gives a cracked appearance similar to that of dried mud; believed to be an indication of lack of film continuity) as do many water based compositions.
(11) They adhere particularly well when baked on metal substrata, particularly steel.

The above-described advantages render the coating compositions of this invention of particular value as protective coatings for metal surfaces, especially in the automobile industry. The nonflammability of such compositions permits them to be utilized in large open tanks into which the entire automobile body or a portion thereof can be dipped to give a thin, corrosion resistant surface over which a topcoat can be sprayed, with or without an intermediate primer, to provide a coating system which offers excellent appearance as well as unusual freedom from corrosion and other deficiencies. In some applications, such as on the underside of automobile bodies, these compositions can be utilized to advantage even without topcoats.

The adduct component of the coating compositions of this invention is prepared by the reaction of about 4 percent to 45 percent by weight of the unsaturated acid anhydride with about 55 percent to 96 percent by weight of the drying oil fatty acid ester or semi-drying oil fatty acid ester.

To form the adducts of the present invention the dicarboxylic acid, or anhydride, is reacted with a drying oil fatty acid ester or semi-drying oil fatty acid ester. Preferably, the drying oils and semi-drying oils per se are employed. Generally, the drying oils are those oils which have an iodine value of above about 130 and the semi-drying oils are those which have an iodine value of about 90 to 130 as determined by method ASTM–D 1467–57T. Included among these oils are linseed oil, soya oil, safflower oil, perilla oil, tung oil, oiticica oil, poppyseed oil, sunflower oil, tall oil esters, walnut oil, dehydrated castor oil, herring oil, menhaden oil, sardine oil, and the like. Also included among such oils are those in which the oils per se are modified with other acids, such as phthalic acid (or anhydride), or benzoic acid by first forming a di- or monoglyceride or a mixture thereof by alcoholysis, followed by esterification. Polyols other than glycerol can also be employed in the alcoholysis. Modification of the oils with cyclopentadiene, styrene or other monomers can also be employed to form useful products. Other esters of unsaturated fatty acids, for example, those prepared by the esterification of tall oil fatty acids of polyols are useful.

Other fatty acid esters which can be reacted with the unsaturated dicarboxylic acid or anhydride to form useful adducts include the alkyd resins prepared utilizing semi-drying or drying oils, that is, semi-drying or drying oil-modified alkyd resins; esters of epoxides with semi-drrying oil fatty acids or drying oil fatty acids, including esters of diglycidyl ethers of polyhydric compounds, as well as other mono-, di- and polyepoxides; semi-drying or drying oil fatty acid esters of polyols such as butanediol, trimethylolethane, trimethylolpropane, trimethylolhexane, pentaerythritol, and the like; and semi-drying or drying oil fatty acid esters of resinous polyols such as copolymers of allyl alcohol with styrene or other $CH_2=C<$ monomers, or non-oil modified alkyds containing free hydroxyl groups. It is intended that all of the foregoing materials be included within the definition of the term "fatty acid esters" as utilized herein.

The unsaturated dicarboxylic acid anhydride utilized in forming the adduct is an alpha, beta-ethylenically unsaturated dicarboxylic acid anhydride, such as maleic anhydride, itaconic anhydride and others. Instead of the anhydride, it is also possible to utilize ethylenically unsaturated dicarboxylic acids which form anhydrides, for example, maleic acid or itaconic acid. These acids probably function by first forming the anhydride. Fumaric acid, which does not form an anhydride, may also be utilized, although with considerably more difficulty than the unsaturated dicarboxylic acid anhydrides or the unsaturated dicarboxylic acids which form anhydrides. Mixtures of the acids and anhydrides may also be utilized. Ordinarily, the anhydride employed should contain from 4 to about 12 carbon atoms, although longer chain compounds can also be employed if desired.

The reaction with non-conjugated oils to form the adduct probably does not take place according to a true Diels-Alder type reaction in which conjugated double bonds must be present, but instead is believed to represent the reaction of an anhydride or acid with the methylene group adjacent to a non-conjugated double bond such as is present in linseed oil. This reaction may be represented as follows, wherein maleic anhydride is utilized for illustrative purposes:

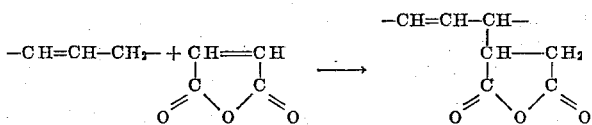

When conjugated oils such as tung oil are utilized, the reaction is probably of the Diels-Alder type.

The above reactions take place readily without the use of catalyst and at temperatures in the range of about 100° C. or 300° C., or more, with most of the reaction occurring in the range of about 200° C. to 250° C. The reaction is ordinarily complete in less than three hours. The adduct obtained is insoluble in water.

The acidity of this adduct is then at least about 50 percent neutralized with ammonia or an amine or a quaternary ammonium hydroxide. Among the amines which may be utilized are those capable of forming water soluble salts, for example, primary, secondary and tertiary amines such as methylamine, ethylamine, propylamine, dimethylamine, diethylamine, dipropylamine, dihexylamine, trimethylamine, triethylamine, tripropylamine, tributylamine, trihexylamine, monoethanolamine, monobutanolamine, diethanolamine, dibutanolamine, triethanolamine, tributanolamine, morpholine, and the like.

The quaternary ammonium hydroxides which may be employed include trimethylbenzyl ammonium hydroxide, triethylbenzyl ammonium hydroxide, trimethyllauryl ammonium hydroxide, triethyllauryl ammonium hydroxide, tributyllauryl ammonium hydroxide, and the like. For obvious reasons of economy, availability, and ease of handling, ammonium hydroxide is the preferred neutralizing agent for the adduct.

Preferably, the pH of the neutralized and solubilized adduct should be maintained in the range of about 7.0 to 10.0. If the pH is substantially higher than 10.0 the viscosity will be substantially lowered and may drift downwardly, whereas if the pH is lower than about 7.0, the viscosity will be increased to the point that the material may too viscous for practical use at a reasonable solids content by ordinary application techniques, and if below 6.0 an unstable resin will result. However, it is an advantage of the materials described herein that the viscosity can readily be maintained within the desired range simply by adjustment of the pH to bring it within the 7.0 to 10.0 pH range.

It has also been found advantageous, although not essential, to add to the neutralized and solubilized adduct a small amount of an amino-alkyl-alkanediol such as 2-methyl-2-amino-1,3-propanediol, 2-ethyl-2-amino-1,3-propanediol, 2-methyl-2-amino-1,4-butanediol, or the like. While the diol obviously has some neutralizing effect, it has been found that it also produces a film with considerably increased hardness and improved water resistance, even though only small amounts are added. For example, optimum efficiency is achieved when only 4 percent by weight of the resinous components is used. Larger amounts have little or no effect on the properties of the film, whereas the water resistance appears to fall off slightly when amounts of less than about 4 percent are employed.

The adducts prepared as described hereinabove, are characterized by forming water insensitive films when baked at 350° F. for 30 minutes. Those adducts which are prepared utilizing at least about 14 percent to 45 percent by weight of the unsaturated carboxylic acid anhydride or acid component are further characterized in that they can be readily solubilized in water without the aid of coupling agents, that is, water soluble solvents which assist in providing water solubility for the adduct. Those adducts prepared utilizing at least 14 percent of the unsaturated carboxylic acid anhydride are preferred since those containing less than 14 percent cannot be utilized as vehicle grinding medium without having solvent present.

The resinous materials which can be blended with the solubilized adducts described hereinabove can be any resin which is either soluble in water, emulsifiable, or dispersible in water. Preferably, however, the blended resin is either a water soluble amine resin, or a synthetic polymeric latex such as a butadiene-styrene latex.

Water soluble amine resins are readily available as commercial materials and can be prepared by methods disclosed in the art, for example, in Experimental Plastics and Synthetic Resins by G. F. D'Alelio. The methods therein disclosed involve generally the condensation of urea with formaldehyde in the presence of an alkaline catalyst. For example, one preferred method involves heating a mixture of paraformaldehyde, water and catalyst until the paraformaldehyde dissolves, after which urea is added. The mixture is refluxed for about 2 hours and the reaction mixture is cooled and filtered. The resulting solution is readily water reducible.

Other amine-aldehyde resins which may be used include the water soluble resins obtained by the condensation of an aldehyde, particularly formaldehyde, with a triazine possessing the structure

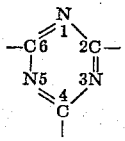

wherein at least one of the free valences is substituted by an amine group. The preferred amine-aldehyde resin is one prepared by the condensation of melamine and formaldehyde.

Water soluble melamine-formaldehyde resins are readily obtained, for example, by the method of U.S. Patent No. 2,529,856 which involves reacting a lower alkanol with a polymethylol melamine in the presence of an acid for such length of time as is necessary to obtain a clear solution and for such a length of time as is necessary to obtain reaction of the alkanol with the polymethylol melamine, then neutralizing said solution or making it slightly alkaline, and concentrating it by distillation in high vacuum until the concentration of resin solids is at the desired level. If a solid, dry resin is desired, the distillation is continued until a substantially anhydrous, viscous syrup is obtained. This syrup, upon cooling, forms a clear, water-white, resinous solid which is infinitely miscible with water, particularly at room temperature.

A similarly useful water soluble melamine-formaldehyde resin can also be obtained by heating a mixture of formaldehyde and melamine to a temperature of about 160° F., and adding to said mixture a solution of an acidic catalyst such as oxalic acid in methanol or other lower alcohols. The resulting reaction product is then distilled at reduced pressure to a solids content of about 75 percent. This product is readily soluble in water.

In addition to melamine, other amino triazines or their derivatives, for example, 2-chloro-4,6-diamino-1,3,5-triazine, 2-phenyl-4,6-diamino-1,3,5-triazine, 6-methyl-2,4-diamine-1,3,5-triazine, N,N-diallylmelamine, and the like may also be utilized to prepare water soluble or water dispersible triazine-aldehyde resins for use in preparing the coating compositions of this invention. Water soluble dicyandiamide-urea-formaldehyde resins and water soluble guanidine-urea-formaldehyde resins may also be used.

Synthetic polymeric latices may also be utilized in combination with the ammonia soluble anhydride-oil adducts. Examples of suitable copolymer latices are diolefin-vinyl aromatic hydrocarbon copolymers such as copolymers of styrene and butadiene; styrene and isoprene; 4-chlorostyrene and butadiene; 4-chlorostyrene and isoprene; 3-chlorostyrene and butadiene; 2-chlorostyrene and butadiene; butadiene and a monomethyl styrene containing the methyl radical as a nuclear substituent; butadiene and acrylonitrile; isoprene and acrylonitrile; butadiene, styrene and ethyl acrylate; or styrene, butadiene and methyl methacrylate. In addition to the above-described latices, it is also possible to employ other synthetic polymeric latices such as polystyrene, polyvinyl toluene or polyvinylidene chloride latices, acrylate and methacrylate latices, for example, styrene-alkyl acrylate latices, vinyl acetate latices, and the like. Preferably the diolefin latices contain from about 40 to 80 mole percent of a diolefin chemically combined with the other polymerizable organic compound. Latices of styrene and butadiene-1,3 are preferably utilized. Of the non-diolefin containing latices, the styrene-alkyl acrylate latices are preferred. In some instances, modification of the latices with unsaturated carboxylic acids may be desirable.

Among the other resins which may be blended with the neutralized, solubilized adducts are the water soluble epoxy compounds such as the diglycidyl ethers of diols, for example, the diglycidyl ether of 1,4-butanediol, and water emulsifiable epoxide resins such as those epoxide resins obtained by the reaction of bisphenols with epihalohydrins.

Also, polymers of N-alkoxymethyl carboxylic acid amides, for example, interpolymers of N-(butoxymethyl)-acrylamide with styrene and ethyl acrylate, and/or other $CH_2=C<$ monomers may be utilized with good results inasmuch as such interpolymers are readily prepared as dispersions in water, or can be made soluble in a basic aqueous solution by incorporating in the interpolymer at least about 7.5 percent of an unsaturated carboxylic acid such as acrylic acid or methacrylic acid. Other thermosetting resins which are water soluble, water dispersible or water emulsifiable may also be used.

The ratio of the solubilized adduct to other resinous materials in the coating compositions is subject to wide variation, but in general, best results are obtained when the adduct comprises from about 40 percent to 95 percent by weight of the total resinous components. However, in some instances it may be desirable to utilize as little as 10 percent or even less of the adduct to enhance the properties of water-dispersed coating compositions in which other resins are present in a predominant amount. It is also possible to employ mixtures in which three or more resinous components are present.

Formulation of the solubilized adduct into coating compositions, with or without added resinous materials, presents no great difficulty. Among the pigments which may be utilized are titanium dioxide, carbon black, talc, barytes, barium sulfate, zinc oxide, strontium chromate, barium chromate, ferric iron oxide, and the like. It has been found that the use of strontium chromate in the pigmentation enhances the corrosion resistance of the baked film. Color pigments such as cadmium yellow, cadmium red, phthalocyanine blue, chromic yellow, toluidine red, hydrated iron oxide, and the like may be utilized if desired.

In addition to the pigment, it is desirable to utilize wetting agents in the formulations, particularly to assist in the wetting of greasy metals. Any of the many commercially available wetting agents can be employed. Useful wetting agents include petroleum sulfonates, modified alcohol sulfates, sulfated fatty amides, sulfated fatty acid amides, alkylphenoxypolyoxyethylene alkanols, coconut acid esters of sodium isothionates, oleic acid esters of sodium isothionates, sodium N-cyclohexyl-N-palmitoyl taurate, sodium N-methyl-N-oleoyl taurate, and the like. Only small amounts of the wetting agent is ordinarily present in an amount of about 0.5 percent to 5 percent by weight based on the weight of the resinous components in the coating composition.

It is also desirable to utilize a drier in the coating composition. Suitable driers include the linoleates, the resinates, the naphthenates, the octoates, and the tallates, of such metals as lead, cobalt, manganese, zinc, copper, calcium, iron, zirconium and other rate earths. Ordinarily such driers contain about 4 percent to 10 percent or more by weight of the metal. Water soluble and/or water dispersible driers may also be employed. The amount of drier employed is subject to wide variation, but in general, it is preferred to utilize from about 1 percent to 5 percent by weight (about 0.05 percent to 1.0 percent of metal) of the resinous components for best drier performance.

In addition to the wetting agents and driers, it is sometimes desirable to employ other additives such as antifoaming agents, suspending agents, bactericides and the like.

The following examples illustrate the preparation of the solubilized fatty acid ester-anhydride adducts and the use thereof in coating formulations. The examples are not intended to limit the invention, however, for there are obviously many possible variations and modifications.

*Example I*

Thirty and four-tenths (30.4) pounds (76 percent) of linseed oil and 9.6 pounds (24 percent) of maleic anhydride were placed in a reactor and heated to a temperature of 375° F. The heat was then turned off and since the reaction is strongly exothermic, the temperature rose to 475° F. to 500° F. After approximately 2½ hours, the reaction mixture was added with stirring to a mixture of 10.5 pounds of 28 percent aqueous ammonium hydroxide and 1.88 pounds of 2-methyl-2-amino-1,3-propanediol and 49.5 pounds of water. The composition had a U-X viscosity and the Gardner-Holdt scale and a solids content of 43 percent. The Gardner color was 14–16 and the weight per gallon was 8.7 pounds. The pH of the composition was 8.5. When neutralized to a pH of 7.5, a sample of the adduct formed a clear solution in water without the use of water soluble organic solvents. A film of the resin baked at 350° F. for 30 minutes was hard, clear, water resistant and corrosion resistant.

*Example II*

A series of oil-anhydride adducts was prepared utilizing varying ratios of anhydride to oil. The reaction was carried out by heating the reaction mixture to 100° C., and then gradually allowing the temperature to increase to 250° F., where it was maintained for about 15 minutes. The reaction mixture was then allowed to cool and portions thereof neutralized with ammonium hydroxide, and in some instances with mixtures of ammonium hydroxide and 2-amino-2-methyl-1,3-propanediol. Water was added to give a desired viscosity and solids content. The pertinent data are set forth in the following table:

| Oil | Anhydride | Ratio Oil/Anhydride (Percent) | Resin Neutralized (Parts by Weight) | 28 Percent Ammonium Hydroxide Utilized (Parts by Weight) | 2-Methyl-2-Amino-1,3-Propanediol (Parts by Weight) | Water Added (Parts by Weight) | Resin Solids | Gardner-Holdt Viscosity | pH |
|---|---|---|---|---|---|---|---|---|---|
| Linseed | Maleic Anhydride | 82.8/17.2 | 2,000 | 496 | | 1,504 | 48.1 | W | 9.1 |
| Do | do | 76/24 | 2,711 | 525 | 120 | 3,176 | 44.2 | U–X | 7.7 |
| Do | do | 67/33 | 1,200 | 446 | | 1,452 | 42.7 | V | 8.1 |
| Soya | do | 76/24 | 768 | 125 | 36 | 936 | 42.5 | $Z_1$–$Z_2$ | 7.7 |
| Tall oil fatty acids-trimethylolethane ester | do | 76/24 | 704 | 135 | | 761 | 44.0 | $Z_6$ | 8.0 |
| Benzoic acid modified linseed | do | 79/21 | 3,000 | 400 | 139 | 3,678 | 41.0 | $Z_1$ | 8.0 |

When adjusted to a pH of 7.5, each of the above resinous materials formed a clear solution in water without the use of water soluble organic solvents to obtain solubility and solution clarity. Films of each of the resins baked for 30 minutes at 350° F. were water insensitive and corrosion resistant. When the process utilized in the examples is repeated using 10 percent of the maleic anhydride component, the resulting resin will not form a clear solution in water even at a pH of 8.5, and when an amount of maleic anhydride is utilized which is in excess of 45 percent, the water resistance of the films prepared from such compositions is extremely poor.

*Example III*

Example I is repeated substituting maleic acid and itaconic acid respectively for the maleic anhydride. In each case, a resin substantially equivalent to the maleic anhydride product was obtained. Similar results are achieved when a mixture of maleic acid and maleic anhydride or a mixture of maleic anhydride and itaconic acid are utilized. Water is given off during the reaction of the acids with the oil, indicating that an anhydride forms.

*Example IV*

Three hundred ninety-two grams (392) of maleic anhydride and 1168 grams of linseed oil were heated to a temperature of 150° C., then slowly to 250° C. and held at this temperature for 15 minutes. After cooling, 100-gram samples of the adduct thus obtained were substantially completely neutralized in water with each of the following amines:

Triethylamine
Diethanolamine
Diethylamine
Piperidine
Morpholine
Trimethylamine

In each instance, the neutralized product was water soluble and formed a clear solution in water at a pH of 7.5 without the use of water soluble organic solvents. Films of each product were hard, clear and water insensitive when baked at 350° F. for 30 minutes.

*Example V*

The water soluble resin of Example I was formulated into a coating composition as follows.

A mixture was prepared from the following materials:

| | Pounds |
|---|---|
| Titanium dioxide (rutile) | 133.5 |
| Lamp black | 13.3 |
| Talc | 18.5 |
| Barytes | 177.9 |
| Strontium chromate | 20.0 |
| Suspending agent (Ben-A-Gel)[1] | 3.6 |
| Maleinized solubilized linseed oil adduct of Example I (43 percent solids in water) | 119.1 |
| Anti-foaming agent | 1.8 |
| Water | 161.8 |

[1] A purified magnesium montmorillonite which is a soft granular powder having a specific gravity of 2.4 and an apparent density in pounds per gallon of 4±0.5; chemically analyzing to contain, as oxides, 56.5 percent $SiO_2$, 25.8 percent magnesium oxide and the remaining constituents being minor amounts of aluminum, iron, calcium, sodium, potassium, and lithium.

The above mixture was ground in a pebble mill for 20 hours to a number 7 Hegeman grind.

To the above mixture the following composition was added:

| | Pounds |
|---|---|
| Butadiene-styrene latex (Dow 566)[1] | 77.2 |
| 28 percent ammonia | 0.5 |
| Maleinized solubilized linseed oil adduct of Example I (43 percent solids in water) | 347.9 |
| Manganese naphthenate (6 percent manganese) | 12.7 |
| Pine oil | 3.6 |
| Wetting agent (Tamol 731)[2] | 3.2 |
| Water | 25.1 |

[1] A styrene-butadiene copolymer latex containing 46 percent resin solids, having a specific gravity at 25° C. of 1.01, a pH of 4±0.5, a Brookfield viscosity in centipoises at 25° C. of 29 at 20 r.p.m. and an average particle size of 0.2 micron, the copolymer particles having a negative charge.
[2] The sodium salt of the condensed arylsulfonic acid, 25 percent solids in water, having a Gardner viscosity between B and I+ and a freezing point of −2° C., the pH of 10 percent aqueous solution being between 9.5 and 10.5.

The resulting composition had a total solids content of 55 percent, of which 59 percent was pigment and 41 percent resin. The viscosity was 24 seconds in a number 4 Ford cup, and the pH was 8.0.

The composition was then reduced with water to a viscosity of 15 seconds in a number 4 Ford cup and films thereof on phosphatized metal were baked for 15 minutes at 180° F. to remove the water and for an additional 15 minutes at 350° F. to complete the cure. The films were resistant to corrosion, humidity, and water and did not mud crack as do highly pigmented latex formulations. Adhesion to the metal was excellent.

*Example VI*

A water soluble resin prepared according to the method of Example I was formulated into a water-dispersed coating composition as follows.

A mixture was prepared from the following materials:

| | Pounds |
|---|---|
| Titanium dioxide (rutile) | 62.0 |
| Lamp black | 13.0 |
| Strontium chromate | 10.0 |
| Barytes | 195.0 |
| Aluminum silicate | 30.0 |
| Water | 87.0 |
| Suspending agent (Ben-A-Gel) | 1.25 |
| Maleinized solubilized linseed oil adduct (43 percent solids in water) | 109.0 |

The above mixture was ground in a pebble mill for 20 hours to form a paste which had a weight of 15.4 pounds per gallon. The paste was then reduced with the following mixture:

| | Pounds |
|---|---|
| Maleinized solubilized linseed oil adduct (43 percent solids) | 274 |
| Water soluble melamine-formaldehyde resin (Cymel 7273-7)[1] | 23 |
| Hexylene glycol | 19 |
| Isopropyl alcohol (for foam inhibition) | 98 |
| Water | 129 |

[1] A methylated methylol melamine formaldehyde resin infinitely dilutable in water, supplied as an 80 percent solution in water, with a pH between 8 and 9.

The resulting coating composition had the following properties:

| | | |
|---|---|---|
| Total solids | percent | 47 |
| Pigment content | do | 63 |
| Pigment/binder ratio | | 1.70/1.00 |
| pH | | 7.8–8.2 |
| Viscosity (number 4 Ford cup) | seconds | 24 |

When reduced to a sprayable or dip viscosity by the addition of 5 percent to 20 percent by weight of water, the above coating composition can be applied to bare or phosphatized metal by spraying or dipping and the films baked initially at 180° F. for about 15 minutes to drive off most of the water and for an additional 15 minutes at about 350° F. The baked films thus obtained are hard, humidity and water resistant, and particularly resistant to corrosion. They find use as dip primers for automobile bodies, shop-coat primers, one-coat primers, and small part finishes. The addition of the melamine has been found to increase film hardness.

Example VII

A series of linseed oil-maleic anhydride adducts was prepared utilizing 4 percent, 6 percent and 9 percent by weight of maleic anhydride. The resulting adducts were then blended in a ratio of 85 percent adduct to 15 percent by weight of a butadiene-styrene latex and formulated into coating compositions as in Example V. The monobutyl ether of ethylene glycol was utilized to impart working properties to the coating formulation. The pigment paste utilized was prepared from the adduct of Example I. Films of the compositions were drawn down and baked for 20 minutes at 350° F. The films were then subjected to humidity for 10 days and to salt spray for 10 days. In each instance, the films exhibited outstanding resistance to salt spray and humidity.

Example VIII

Two hundred eighty (280) parts of tall oil fatty acids, 220 parts of a styrene-allyl alcohol copolymer (Shell X–450, a copolymer having the repeating unit:

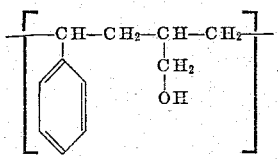

a molecular weight of 1150, and an average of 5.2 hydroxyl groups per mole, the viscosity of a 50 percent solution in butyl carbitol at 25° C. being 12.6 poises) and 50 parts of aromatic petroleum naphtha were heated to 225° C. for 2½ hours with azeotropic distillation to give a product having an acid value of 10. The temperature was then raised to 250° C. for an additional hour, at which time the acid value was less than 1.0. The solvent was removed by blowing with inert gas and the reaction mixture cooled to 100° C. To the product thus obtained 125 parts of maleic anhydride was added and the resulting mixture heated under reflux to a temperature of 250° C. for ½ hour. The adduct thus formed was poured into a mixture of 2100 parts of water and 80 parts of morpholine. A clear solution having a solids content of 25 percent, a Gardner-Holdt viscosity of $Z_6+$ and a pH of 7.5 was obtained. This product could be formulated as in Example V to give a coating composition, films of which are resistant to corrosion, humidity and water.

Example IX

The following materials were charged into a glass reactor:

| | Grams |
|---|---|
| Epoxy resin (Epon 828)[1] | 700 |
| Tall oil fatty acids | 2240 |
| Xylene | 150 |

[1] A condensation polymer of epichlorohydrin and para,para'-isopropylidenediphenol having an epoxy equivalent between 175 and 210, molecular weight between 350 and 400 and a viscosity at 25° C. of between 5,000 and 15,000 centipoises.

The above materials were heated for 13 hours in an atmosphere of inert gas and at temperatures ranging from 186° C. to 242° C. The product had an acid value of 24.0. The xylene was removed by blowing with an inert gas. To the product thus formed, 700 grams of maleic anhydride was added and the mixture heated at a temperature in the range of 75° C. to 251° C. for approximately 3 hours. One thousand seven hundred and fifty (1750) parts of the hot resin was added to a mixture of 3500 parts of water and 240 parts of morpholine. The resulting composition had a pH of 6.5, a solids content of 37.1 percent and was slightly hazy. Useful coating compositions could be prepared from this adduct by formulating according to the method of Example V.

Example X

The following materials were charged into a glass reactor:

| | Parts |
|---|---|
| Unox epoxide 201 (Union Carbide) having the structure: 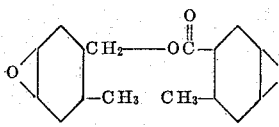 | 175 |
| Tall oil fatty acids | 700 |
| Xylene | 25 |

The above mixture was heated for a period of 9 hours at a temperature in the range of 168° C. to 190° C. under an atmosphere of inert gas. After cooling, the product had a Gardner-Holdt viscosity of K and an acid value of 25.0.

Two hundred fourteen (214) parts of maleic anhydride were added to the reactor and the resulting mixture heated for 2¼ hours at temperatures in the range of 120° C. to 203° C. After cooling, the adduct thus prepared had a Gardner-Holdt viscosity of $Z_6+$. Two hundred (200) parts of this adduct were then poured into a mixture of 300 parts of deionized water and 30 parts of morpholine. The composition had a pH of 6.2. The pH was then raised to 6.5 by the addition of 4 parts of morpholine. The resulting composition was clear and formed useful coating compositions when formulated with synthetic polymeric latices in the manner described hereinabove. Films of the compositions are corrosion and humidity resistant.

Example XI

| | Parts by weight |
|---|---|
| Linseed oil | 126.30 |
| Maleic anhydride | 39.90 |
| Water | 251.30 |
| Dimethylethanolamine | 33.30 |
| Phenyl mercuric acetate (PMA–30) | 0.25 |

The linseed oil and maleic anhydride were placed in a reactor and heated to a temperature of 375° F. The heat was then turned off and since the reaction is strongly exothermic, the temperature rose to 475° F. to 500° F. Two and one-half hours after the exotherm, the reaction mixture was added with stirring to the water, dimethylethanolamine and the phenyl mercuric acetate at a rate so that the water solution did not exceed 150° F. The composition had the following properties:

| | |
|---|---|
| Solids (percent) | 38.8 |
| Viscosity (Gardner-Holdt) | S |
| Color | 12+ |
| Density (weight/gallon, pounds) | 8.61 |
| pH | 7.37 |

*Example XII*

| | Parts by weight |
|---|---|
| Carbon black pigment | 672 |
| Magnesium silicate (talc) | 900 |
| Barytes (barium sulfate) | 14,232 |
| Strontium chromate | 900 |
| Suspending agent (Ben-A-Gel) | 172 |
| Maleinized solubilized linseed adduct of Example XI | 6,140 |
| Zinc oxide | 900 |
| Colloid 566 (non-ionic antifoaming agent) | 84 |
| Zinc oxide stabilizer | 268 |
| Water | 1,124 |

The above ingredients were ground in a ball mill for 64 hours and more water (1570 parts) was added. The ingredients were then ground to a number 6¾ Hegeman grind.

*Example XIII*

| | Parts by weight |
|---|---|
| Maleinized solubilized linseed oil adduct of Example XI | 1780 |
| High boiling aromatic naphtha (Solvesso 150) | 166 |
| Phenyl mercuric acetate (PMA–30) | 33 |

The above ingredients were blended in a suitable agitating device and added to 3080 parts of a latex having a terpolymer of acrylic ester, styrene and vinyl acid containing about 8 percent acid, the latex containing approximately 44 percent solids, and having a pH of 8.7; the particles of latex having an anionic charge (Dow X–2270). After effecting homogeneity, 6742 parts of a paste of Example XII were intermixed with the latex. The product had a solids content of 46.5 percent.

*Example XIV*

| | Parts by weight |
|---|---|
| Malenized solubilized linseed oil adduct of Example XI | 1780 |
| High boiling aromatic naphtha (Solvesso 150) | 166 |
| Phenyl mercuric acetate (PMA–30) | 33 |

The above ingredients were blended in a suitable agitating device and added to 3060 parts of a latex having about 46 percent solids of a polymer containing about 95 percent ethyl acrylate and about 5 percent acrylonitrile (Hycar 2671). After effecting homogeneity, 6742 parts of the paste of Example XII were intermixed with latex. The product had a solids content of 52.7 percent.

*Example XV*

The following example relates to the preparation of a long oil alkyd.

| | Parts by weight |
|---|---|
| Linsed oil | 2550 |
| Trimethylolethane | 159 |
| Litharge (PbO) | 1.5 |
| Phtharlic anhydride | 209 |
| Benzoic acid | 126 |
| Xylene | 60 |

The linseed oil and trimethylolethane were heated in a vessel equipped with thermometer, stirrer and condenser for 47 minutes to 392° F. and the litharge was added to the vessel. The reaction mixture was then heated to 460° F. and held for one hour, cooled to 440° F. and the phthalic anhydride and the benzoic acid were added with the xylene. The reaction mixture was then refluxed at 480° F. for three hours more. The resulting resinous composition had the following properties:

| | |
|---|---|
| Solids (percent) | 97.8 |
| Viscosity (Gardner-Holdt) | D |
| Acid number | 13.95 |
| Density (weight/gallon, pounds) | 7.92 |
| Color (Gardner) | 10+ |

The above composition (1580 parts) was mixed in a vessel with 150 parts of maleic anhydride at a temperature of 400° F. After 19 minutes, the reaction temperature rose to 408° F. and 150 parts more of maleic anhydride were added to the vessel. After 24 minutes, a third and last addition of 150 parts of maleic anhydride was made, the reaction temperature being 404° F. The reaction temperature was gradually raised to 460° F. over a 52-minute period. The resulting resinous composition which was cut with water to 40 percent solids using 2592 parts $H_2O$ and 430 parts $NH_4OH$ had the following properties:

| | |
|---|---|
| Solids (percent) | 39 |
| Viscosity (Gardner-Holdt) | $Z_6$ |
| Solvent | $H_2O$ |
| pH | 8.3 |
| Density (weight/gallon, pounds) | 8.70 |
| Color (Gardner) | 15+ |

Although specific examples of the invention have been set forth, it is not intended to limit the invention solely thereto, but to include all of the variations and modifications falling within the scope of the appended claims.

We claim:

1. A water dispersed coating composition comprising a synthetic polymeric latex and the adduct of from about 4 percent to 45 percent of a member of the class consisting of anhydrides of alpha, beta-ethylenically unsaturated dicarboxylic acids, alpha, beta-ethylenically unsaturated dicarboxylic acids which form anhydrides, and mixtures thereof, and from about 55 percent to 96 percent of a member of the class consisting of drying oil fatty acid esters and semi-drying oil fatty acid esters, said adduct having at least 50 percent of its acidity neutralized with a member of the class consisting of ammonia, amines, and quaternary ammonium hydroxides, and being characterized by forming water insensitive films when baked at a temperature of 350° F. for 30 minutes.

2. The water dispersed coating composition of claim 1 wherein the synthetic polymeric latex is present in an amount of about 5 percent to 40 percent by weight of the resinous components, the remainder of said resinous components being the adduct of an unsaturated carboxylic acid anhydride and a member of the class consisting of drying oil fatty acid esters and semi-drying oil fatty acid esters, said adduct having at least about 50 percent of its acidity neutralized with a member of the class consisting of ammonia, amines, and quaternary ammonium hydroxides, and being characterized by forming water insensitive films when baked at a temperature of 350° F. for 30 minutes.

3. The coating composition of claim 2 wherein the adduct is the adduct of maleic anhydride and a linseed oil-trimethylolethane-phthalic anhydride alkyd resin.

4. The coating composition of claim 2 wherein the adduct is the adduct of maleic anhydride and a tall oil fatty acid ester of an epoxy resin.

5. The coating composition of claim 2 wherein the adduct is the adduct of maleic anhydride and a tall oil fatty acid ester of a styrene-allyl alcohol copolymer.

6. The dispersed coating composition of claim 2 wherein the synthetic polymeric latex is a butadiene-styrene latex.

7. The dispersed coating composition of claim 2 wherein the synthetic polymeric latex is a styrene-ethyl acrylate latex.

8. The dispersed coating composition of claim 2 wherein the synthetic polymeric latex is an ethyl acrylate-acrylonitrile latex.

9. The dispersed coating composition of claim 2 wherein the adduct is the adduct of maleic anhydride and an alkyd resin comprising linseed oil, trimethylolethane, phthalic anhydride and benzoic acid.

10. A water dispersed coating composition, the resinous components of which consist essentially of from 40 percent to 95 percent by weight of the adduct of from 4 percent to 45 percent maleic anhydride and about 55 percent to 96 percent of linseed oil, said adduct having been prepared at a temperature in the range of 100° C. to 300° C., and having at least about 50 percent of its acidity neutralized with aqueous ammonium hydroxide, said adduct being characterized by forming water insensitive films when baked at a temperature of 350° F. for 30 minutes, and from about 5 percent to 60 percent by weight of a butadiene-styrene latex.

11. The water dispersed coating composition of claim 10 wherein the adduct of maleic anhydride and linseed oil is an adduct of 24 percent maleic anhydride and about 76 percent of linseed oil.

References Cited by the Examiner

UNITED STATES PATENTS

| | | | |
|---|---|---|---|
| 2,188,882 | 1/1940 | Clocker | 260—18 |
| 2,492,124 | 12/1949 | Young et al. | 260—29.7 |
| 2,683,698 | 7/1954 | Bates | 260—29.7 |
| 2,726,967 | 12/1955 | Eger et al. | 260—29.7 |
| 2,992,197 | 7/1961 | Baller | 260—23 |

OTHER REFERENCES

"General-Purpose Gr–S Latices"; India Rubber World, vol. 109, No. 6, pp. 577–584, New York.

LEON J. BERCOVITZ, *Primary Examiner.*

ALPHONSO D. SULLIVAN, *Examiner.*

C. W. IVY, T. D. KERWIN, *Assistant Examiners.*